(12) United States Patent
Guo et al.

(10) Patent No.: US 10,044,995 B2
(45) Date of Patent: Aug. 7, 2018

(54) PROJECTION IMAGE CORRECTING METHOD AND PROJECTION APPARATUS

(71) Applicants: HISENSE CO., LTD., Qingdao (CN); HISENSE USA CORPORATION, Suwanee, GA (US); HISENSE INTERNATIONAL CO., LTD., Qingdao (CN)

(72) Inventors: Dabo Guo, Qingdao (CN); Zhen Wang, Qingdao (CN)

(73) Assignees: HISENSE CO., LTD., Shandong (CN); HISENSE USA CORPORATION GA (US); HISENSE INTERNATIONAL CO., LTD., Shandong (CN)

( * ) Notice: Subject to any disclaimer, the term of this patent is extended or adjusted under 35 U.S.C. 154(b) by 0 days.

(21) Appl. No.: 15/390,437

(22) Filed: Dec. 23, 2016

(65) Prior Publication Data

US 2017/0353703 A1 Dec. 7, 2017

(30) Foreign Application Priority Data

Jun. 3, 2016 (CN) .......................... 2016 1 0394559

(51) Int. Cl.
*G03B 21/14* (2006.01)
*G03B 21/28* (2006.01)
*H04N 9/31* (2006.01)

(52) U.S. Cl.
CPC ......... *H04N 9/3179* (2013.01); *H04N 9/3141* (2013.01); *H04N 9/3194* (2013.01);
(Continued)

(58) Field of Classification Search
CPC ...... G03B 21/28; G03B 21/14; G03B 21/147; H04N 9/3182; H04N 9/3185; H04N 9/317
(Continued)

(56) References Cited

U.S. PATENT DOCUMENTS

| 2003/0117714 A1* | 6/2003 | Nakamura | ........... H04N 9/3147 359/649 |
| 2007/0097329 A1* | 5/2007 | Ho | .......................... G03B 21/10 353/77 |

(Continued)

FOREIGN PATENT DOCUMENTS

| CN | 1700083 A | 11/2005 |
| CN | 1848227 A | 10/2006 |

(Continued)

OTHER PUBLICATIONS

The extended European Search Report of corresponding European application 16206857.1, dated Jul. 26, 2017.

(Continued)

*Primary Examiner* — Ryan Howard
(74) *Attorney, Agent, or Firm* — J.C. Patents

(57) ABSTRACT

The present disclosure provides a projection image correcting method and a projection apparatus. The method includes: receiving real-time brightness values of M sub-images in a current to-be-displayed image, the real-time brightness values being acquired by a plurality of sensors arranged on a reflector which is located opposite to a projection lens, and obtaining a brightness adjusting value of a j-th sub-image in the current to-be-displayed image according to the real-time brightness values of the M sub-images. Adjustment is made, in combination with brightness adjusting values obtained from the current image to be displayed, to brightness values of each sub-image in an image to be displayed after the current to-be-displayed image, thereby making brightness of displayed images uniform, and improving the projection image quality.

19 Claims, 6 Drawing Sheets

(52) U.S. Cl.
CPC ............ *G03B 21/147* (2013.01); *G03B 21/28* (2013.01); *H04N 9/3185* (2013.01)

(58) Field of Classification Search
USPC .......................... 353/98, 99, 77, 78, 69, 70
See application file for complete search history.

(56) References Cited

U.S. PATENT DOCUMENTS

| | | |
|---|---|---|
| 2007/0258056 A1 | 11/2007 | Noji ................................ 353/78 |
| 2011/0148904 A1 | 6/2011 | Kotani .......................... 345/589 |
| 2011/0304825 A1 | 12/2011 | Sieler et al. ..................... 353/20 |
| 2013/0107233 A1 | 5/2013 | Hirakawa et al. .............. 353/99 |

FOREIGN PATENT DOCUMENTS

| | | |
|---|---|---|
| CN | 101180888 A | 5/2008 |
| CN | 102737610 A | 10/2012 |
| CN | 103327274 A | 9/2013 |
| CN | 105491359 A | 4/2016 |
| CN | 105632386 A | 6/2016 |
| CN | 106094405 A | 11/2016 |
| JP | 2009-216767 A | 9/2009 |

OTHER PUBLICATIONS

The International Search Report of corresponding international PCT application No. PCT/CN2016/111832, dated Mar. 22, 2017.
The Chinese First Examination Report of corresponding Chinese patent application No. 201610394559.6, dated Jun. 28, 2017.

\* cited by examiner

PROJECTION IMAGE CORRECTING METHOD AND PROJECTION APPARATUS

CROSS-REFERENCE TO RELATED APPLICATIONS

This application claims priority to Chinese Patent Application No. 201610394559.6, filed on Jun. 3, 2016, entitled "PROJECTION IMAGE CORRECTING METHOD, DEVICE AND PROJECTOR", which is hereby incorporated by reference in its entirety.

TECHNICAL FIELD

The present disclosure relates to displaying technologies, and particularly to a projection image correcting method and a projection apparatus.

BACKGROUND

In the field of projection display, ultra short throw projection is increasingly wide-spreading for its conveniences in use. A projection apparatus includes four parts: a projection light source, an optical assembly, a lens and a screen, where the projection light source provides for the optical assembly with multi-primary-color (usually in three primary colors, i.e. red, green and blue, but may be other combinations as well) illumination light beams following a time sequence. When the light beams illuminate the core component of the optical assembly, i.e. a digital micro mirror device (DMD), the DMD will reflect, under the modulation of a display image signal, light beams of corresponding color components into the lens to form an image, where the lens of the projection apparatus is an ultra short-focus lens that includes an optic set and a reflector, to realize a low throw ratio through secondary imaging.

While projecting the image, it is desired that the light beams coming out of the projection light source into the optical assembly, the light beams being reflected by the DMD into the lens, and the light beams being reflected by the reflector all have uniform brightness, so as to alleviate nonuniform in the brightness of the projection image.

However, when an image is projected, the brightness may appear to be nonuniform. This phenomenon is due to the fact that the capacity of the optical lenses to reform and homogenize the light beams is limited by their craftsmanship, as well as accumulated tolerances in assembling and machining of each lens in the system architecture. When such nonuniformity is magnified and displayed onto the projection screen, a user will notice unwanted contrasts of brightness against darkness within image regions on the screen, leading to deteriorated projection image quality.

SUMMARY

Embodiments of the present disclosure provide a projection image correcting method and a projection apparatus to overcome the problem in prior art where projection image quality deteriorates due to nonuniform brightness in an image projected onto a screen.

On a first aspect, the present disclosure provides a projection apparatus including: a projection light source assembly, a digital micro mirror device (DMD) assembly and a screen, where the apparatus further comprises:
an ultra short-focus lens,
where the ultra short-focus lens includes an optic set and a reflector; the optic set is configured to receive a light beam emitted from the DMD assembly, and transmit the light beam onto the reflector; the reflector is configured to reflect the light beam transmitted from the optic set onto the screen;
where the reflector is provided with a plurality of sensors on a side away from the screen, the sensors are configured to acquire a real-time brightness value of at least one sub-image in a current to-be-displayed image.

On a second aspect, the present disclosure provides a projection image correcting method, applied to the projection apparatus according to any one of the first aspect, where the method includes:
receiving real-time brightness values of M sub-images in a current to-be-displayed image, the real-time brightness values being acquired by the plurality of brightness sensors arranged on the reflector of the projection apparatus, where M is a positive integer greater than or equal to 1; and
obtaining a brightness adjusting value of a j-th sub-image in the current to-be-displayed image according to the real-time brightness values of the M sub-images, where j is a positive integer taken in sequence from $[1, 2, \ldots, M]$.

On a third aspect, the present disclosure provides a projection apparatus including: a memory and a processor, where the memory includes operating instructions executed by the processor to perform a method according to any one of the second aspect.

In embodiments of the present disclosure, real-time brightness values of M sub-images in a current to-be-displayed image, which are acquired by a plurality of sensors arranged on a reflector which is located opposite to a projection lens, are received, and the current to-be-displayed image is a pure color image. A brightness adjusting value of the j-th sub-image in the current to-be-displayed image is obtained according to a brightness correcting value. Then, a brightness value of a j-th sub-image in an f-th to-be-displayed image is adjusted according to the brightness adjusting value of the j-th sub-image in the current to-be-displayed image. Finally, the f-th to-be-displayed image is displayed according to adjusted brightness values of all sub-images in the f-th to-be-displayed image.

When an image is projected, light beams typically have different transmission characteristics. Hence, a pure color image may be introduced to test whether brightness of respective projection regions is uniform, so as to determine brightness unevenness caused by factors innate to the projection system. Meanwhile, a brightness adjusting value may also be determined, which may be utilized to adjust real time brightness values of other images to be displayed, thereby overcoming the problem of nonuniform brightness in the other images to be displayed, which is caused by innate defects in the projection system. That is, in the present disclosure, adjustment is made, in combination with brightness adjusting values obtained from the current image to be displayed, to a brightness value of each sub-image in an f-th to-be-displayed image before the f-th image is displayed on a screen, which achieves uniform and even brightness among all sub-images in the f-th image ultimately displayed on the screen, thereby improving image projection quality.

BRIEF DESCRIPTION OF DRAWINGS

A brief introduction will be given hereinafter to the accompany drawings which will be used in the description of the embodiments or prior art in order to explain the technical resolutions of the embodiments of the present disclosure or prior art more clearly. Apparently, the drawings in the description below are merely illustrating some embodiments of the present disclosure. Those skilled in the art may obtain other drawings according to these drawings without creative effort.

DETAILED DESCRIPTION

In order to make objectives, technical solutions and advantages of embodiments of the present disclosure clearer, the technical solutions in embodiments of the present disclosure will be described hereunder clearly with reference to accompanying drawings. Obviously, the described embodiments are only a part of embodiments of the present disclosure, rather than all of them. Any other embodiments obtained by persons skilled in the art based on the embodiments of the present disclosure herein without making any creative effort shall fall into the protection scope of the present disclosure.

Figure 1:
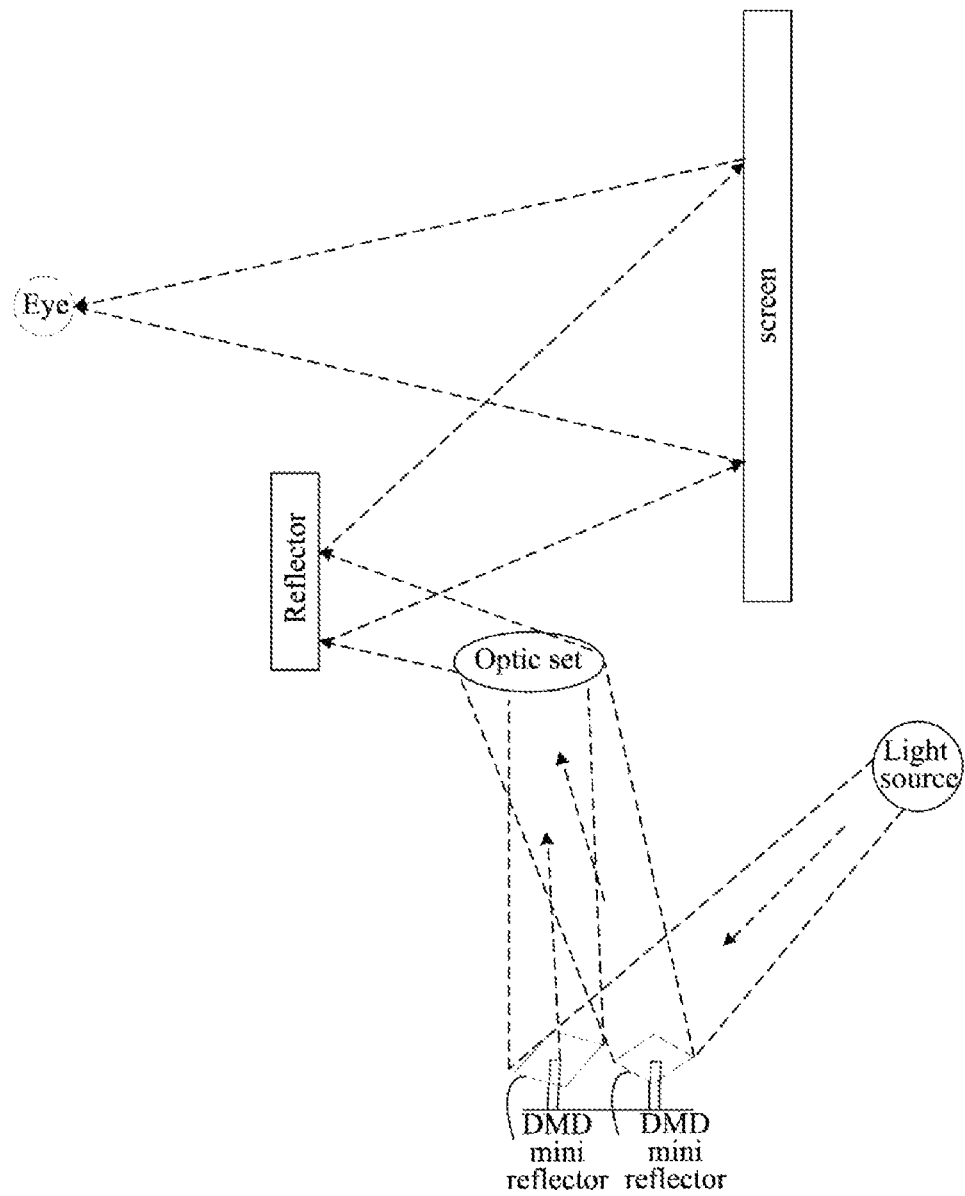
FIG. 1 is a schematic structural diagram of a projection system in prior art.

FIG. 1 is a schematic structural diagram of a projection system in prior art. As depicted in FIG. 1, the projection system includes a light source, a digital micro mirror device (DMD), an optic set and a reflector, where the DMD receives light emitted from the light source, and controls each DMD mini reflector within the DMD according to information associated with displaying image signal (e.g. eigenvalues of respective pixels in a to-be-displayed image), so that respective DMD mini reflectors are rotated to different angles; Respective rotated DMD mini reflectors produce light beams of corresponding color components, and reflect the light beams of corresponding color components to the lens so as to form an image through the optic set. The optic set transmits the light beams after the image formation to the reflector which then reflects the incoming light beams onto a screen, so as to present the to-be-displayed image on the screen.

In the projection process, the brightness may appear to be nonuniform when an image is projected. This phenomenon is due to the fact that the capacity of the optical lenses to reform and homogenize the light beams is limited by their craftsmanship, as well as accumulated tolerances in assembling and machining of each lens in the system architecture. When such nonuniformity is magnified and displayed onto the projection screen, a user will notice unwanted contrasts of brightness against darkness within image regions on the screen, leading to deteriorated projection image quality.

Accordingly, the present disclosure acquires real-time brightness values of a current to-be-displayed image, which is a pure color image incoming to the reflector, by arranging a plurality of brightness sensors on a side of the reflector away from the screen. Then, an appropriate brightness adjusting value is determined according to real time brightness values of the current to-be-displayed image which is incoming to the reflector, and real-time brightness values of images to be displayed after the current to-be-displayed image are adjusted according to the brightness adjusting value, which reduces brightness distortion caused by defects in system hardware, thereby making brightness of the images to be displayed after the current to-be-displayed image uniform, effectively improving projection image quality.

Now, technical solutions of the present disclosure will be detailed with reference to particular embodiments. It should be noted that the particular embodiments may be recombined, and same or similar concepts or processes might not be repeated in some embodiments.

Figure 2:
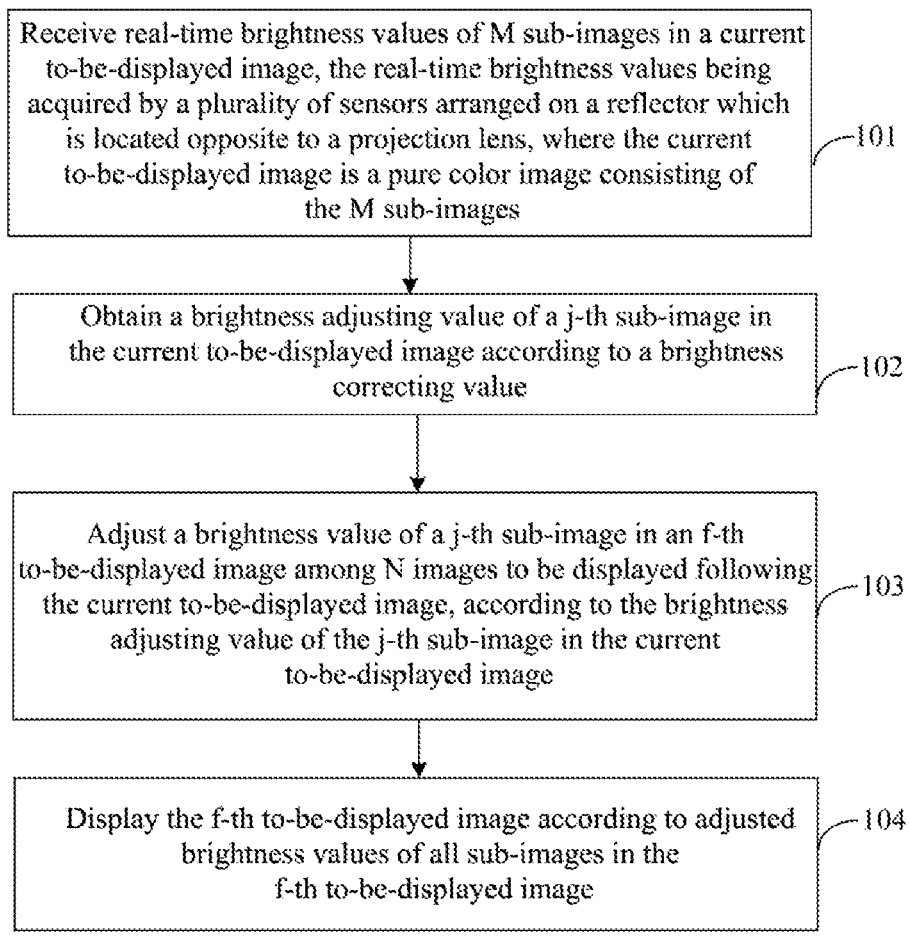
FIG. 2 is a schematic diagram of a projection image correcting method provided in an embodiment of the present disclosure.

FIG. 2 is a schematic diagram of a projection image correcting method provided in an embodiment of the present disclosure. As depicted in FIG. 2, the method is applied to a projection apparatus, and the method according to an embodiment includes:

Step 101: real-time brightness values of M sub-images in a current to-be-displayed image are received, the real-time brightness values being acquired by a plurality of sensors arranged on a reflector which is located opposite to a projection lens, where the current to-be-displayed image is a pure color image consisting of the M sub-images, M being a positive integer greater than or equal to 1.

It may be noted that, the entity for acquiring the real-time brightness values of the M sub-images in the current to-be-displayed image may be the brightness sensors or other devices capable of acquiring brightness values, which will not be limited herein.

The current to-be-displayed image is the display image corresponding to which the real-time brightness values acquired by the brightness sensors. If the brightness sensors are added on the screen to acquire the real-time brightness values of the M sub-images in the current to-be-displayed image, the brightness sensors will need to be further connected to the projector in order to send to the projector the real-time brightness values of the M sub-images in the current to-be-displayed image, so as to cause the projector to adjust real-time brightness values of images to be displayed after the current to-be-displayed image, according to the real-time brightness values of the M sub-images in the current to-be-displayed image. This practice will lead to complicated and entangled connections. Or, if an external camera is added external to the projector to acquire the real-time brightness values of the M sub-images in the current to-be-displayed image, a problem of connecting these devices to the projector will be involved, leading to increased internal complexity in the projector structure. Moreover, adding brightness sensors on the screen, or adding external cameras to the projector, will introduce additional issues, including distortions due to difference in angle of views, leading to failure to faithfully represent the actual real-time brightness values of the M sub-images in the current to-be-displayed image.

In order to make the acquired real-time brightness values of the M sub-images of the current to-be-displayed image closer to the actual real-time brightness values of the M sub-images of the current to-be-displayed image, which helps achieving better adjustment effect, the present disclosure allows arranging the brightness sensors within the projector at the position of a final end component for projecting light beams onto the screen, enabling the brightness sensors to acquire, within the projector, the real-time brightness values of the M sub-images in the current to-be-displayed image. Since the brightness sensors are arranged at the position of the final end component for projecting the light beam onto the screen, the real-time brightness values of the M sub-images in the current to-be-displayed image may be more accurately acquired by the brightness sensors. Moreover, because the brightness sensors are arranged within the projector where the wirings are controllable, no complication will be introduced into the connections.

In the projector, the reflector is the last component that the light propagating path touches. At this position, the actual real-time brightness values (i.e. the final brightness values of the light beams after going through all optical components included in the projection system) of the M sub-images in the current to-be-displayed image immediately before the image is projected onto the screen may be faithfully represented. In addition, the reflector is located within the projector where wirings are controllable, hence no complication will be introduced into the connections.

Figure 3:
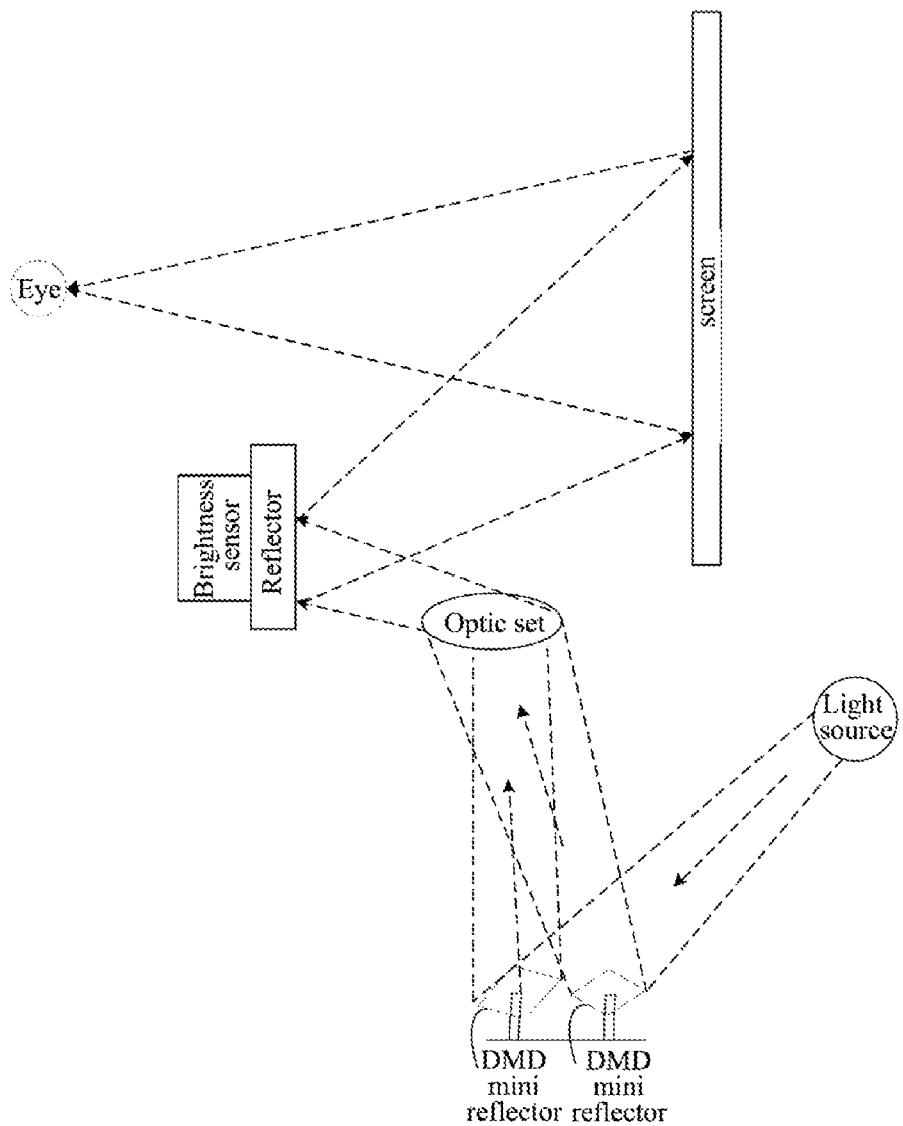
FIG. 3 is another schematic diagram of a projection image correcting method provided in an embodiment of the present disclosure.

In view of the foregoing analysis, it can be appreciated in the present disclosure that, as depicted in FIG. 3, the brightness sensors may be, on the basis of the illustration in FIG. 1, arranged on a side of the reflector away from the screen, where the reflector is located opposite to the projection lens. In this case, the side of the reflector away from the screen may be partitioned into M sub-regions, with one brightness sensor being arranged in each sub-region, where the j-th sub-region corresponds to the j-th sub-image in the current to-be-displayed image. Thus, the brightness value of the j-th sub-image in the current to-be-displayed image may be acquired through the brightness sensor arranged in the j-th sub-region. Each one of the M sub-regions may be of the same or different size. For example, the regions at the edges or other places where brightness tends to lower may be partitioned into more sub-regions, so that brightness sensors may be more densely deployed in these regions, thereby better solving a phenomenon where image edges are visibly darker than image centers, achieving consistency and uniformity for the brightness and color displayed. The present disclosure does not limit the particular way for partitioning these M sub-regions.

Optionally, in an embodiment, the plurality of brightness sensors may be arranged on the side of the reflector away from the screen and grouped, with each brightness sensor corresponding to one sub-image in the current to-be-displayed image. The plurality of brightness sensors may be deployed with the same or different density. For example, the brightness sensors may be slightly more densely deployed at the edge position of the reflector, and slightly less densely deployed at the central position of the reflector. That is, the brightness sensors are arranged with higher density at the edge position of the reflector than at the central position thereof. Or, respective brightness sensors may correspond to sub-images of the same or different areas in the current to-be-displayed image. For example, a brightness sensor at the edge position of the reflector may correspond to a sub-image of smaller area in the current to-be-displayed image, while a brightness sensor at the central position may correspond to a sub-image of larger area in the current to-be-displayed image. That is, the brightness sensors at the edge position of the reflector correspond to sub-images of smaller area in the current to-be-displayed image than those at the central position of the reflector.

Figure 4:
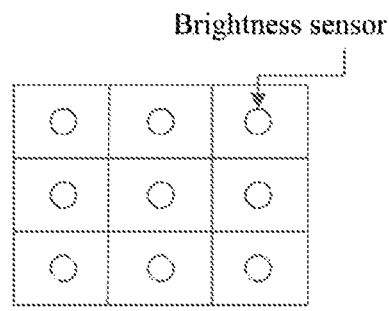
FIG. 4 is a schematic diagram illustrating a partition of sub-regions on a side of a reflector away from a screen.
Figure 5:
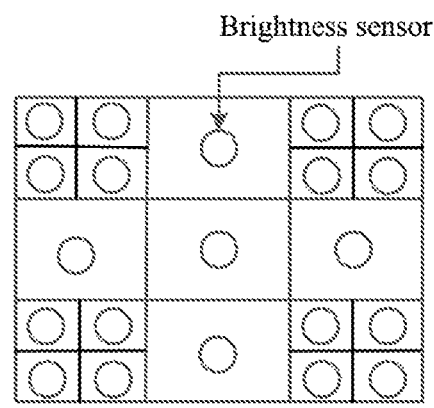
FIG. 5 is another schematic diagram illustrating a partition of sub-regions on a side of a reflector away from a screen.

For example, in FIG. 4, which is a schematic diagram illustrating a partition of sub-regions on a side of a reflector away from a screen, it is depicted that the side of the reflector away from the screen may be partitioned into 9 sub-regions of the same size, with one brightness sensor being arranged within each sub-region. In FIG. 5, which is another schematic diagram illustrating a partition of sub-regions on a side of a reflector away from a screen, it is depicted that, on the basis of FIG. 4, the side of the reflector away from the screen may be partitioned into 21 sub-regions, where each of the sub-regions in the four corners is further partitioned into 4 sub-regions, and each sub-region is arranged with one brightness sensor.

Figure 7:
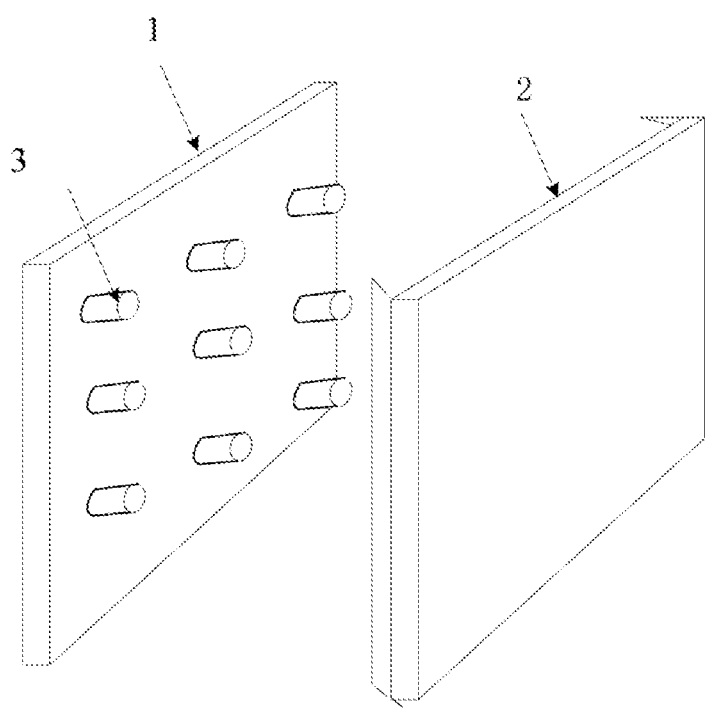
FIG. 7 is a schematic diagram illustrating an arrangement of brightness sensors provided in an embodiment of the present disclosure.
Figure 8:
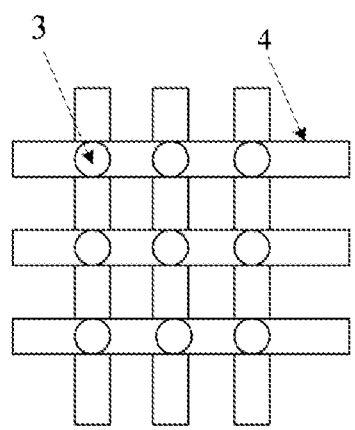
FIG. 8 is another schematic diagram illustrating an arrangement of brightness sensors provided in an embodiment of the present disclosure.

Optionally, the brightness sensors may be arranged on the side of the reflector away from the screen in the following manners. As depicted in FIG. 7, the brightness sensors 3 are fixedly arranged on a structural member 1 according to the positions of the sub-regions so partitioned, the structural member 1 being fixedly arranged on a side of the reflector 2 away from the screen. Further, the structural member 1 may be shaped the same as the reflector 2, which is exemplified as a flat reflector in FIG. 7. Or optionally, the structural member may, as depicted in FIG. 8, be a supporting frame. That is, the brightness sensors 3 are fixedly arranged, according to the positions of the sub-regions so partitioned, on a supporting frame 4 that is fixedly arranged on the side of the reflector away from the screen.

When the reflector is a flat reflector, the structural member is structured as a flat plate; and when the reflector is a curved reflector, the structural member is structured as a curved plate of the same shape as the reflector.

As depicted FIG. 8, the supporting frame 4 is structured by joining a plurality of plates, with each brightness sensor being arranged at the position where two of the plates are joined.

Since the brightness sensors arranged on the side of the reflector away from the screen need to acquire the real-time brightness values of M sub-images in the current to-be-displayed image which is reflected by the side of the reflector close to the screen, the reflector herein will need to have certain transmittance so that the brightness sensors arranged on the side of the reflector away from the screen can acquire, according to light beams transmitted by the reflector, the real-time brightness values of M sub-images in the current to-be-displayed image which is reflected by the side of the reflector close to the screen. In particular, the reflector herein may cause 90% of the light beams to be reflected, while 10% thereof or less to pass through.

Optionally, a weight coefficient corresponding to each of the sub-regions may be predetermined according to the light transmittances of respective sub-regions on the reflector.

For example, as depicted in FIG. 4, among 9 sub-regions, those at the edge position have the same light transmittance, while the one at the center has a different transmittance. Since this sub-region at the center has a higher transmittance than the others, it may be set with a weight coefficient different from, e.g. smaller than, the other sub-regions.

The real-time brightness value acquired by the brightness sensor is multiplied by the weight coefficient to generate the final real-time brightness value of the sub-region.

Step 102: a brightness adjusting value of the j-th sub-image in the current to-be-displayed image is obtained according to a brightness correcting value, where j is a positive integer taken in sequence from $[1, \ldots, M]$.

The brightness correcting value may be set in real time according to actual needs, or be predetermined. Neither the particular value nor the particular means by which that value is acquired is limited in the present disclosure.

The brightness adjusting value is used to compensate the brightness for sub-images of images to be displayed later, that is, to adjust the brightness values of sub-images of images to be displayed following the current to-be-displayed image.

In actual applications, if the current to-be-displayed image is a pure color image, the maximum value among real-time brightness values of M sub-images in the current to-be-displayed image may be selected to be the brightness correcting value.

The pure color image is uniform in terms of brightness, i.e. the real-time brightness value of a sub-image may represent the brightness of the sub-image.

Continuing the above example, as shown in Table 1, 9 brightness sensors in FIG. 4 acquire the real-time brightness values of the 9 sub-images in the current to-be-displayed image, respectively, where the first sub-image has a real-time brightness value of 90, the second sub-image has a real-time brightness value of 95, the third sub-image has a real-time brightness value of 85, the fourth sub-image has a real-time brightness value of 95, the fifth sub-image has a real-time brightness value of 100, the sixth sub-image has a real-time brightness value of 95, the seventh sub-image has a real-time brightness value of 85, the eighth sub-image has a real-time brightness value of 95, and the ninth sub-image has a real-time brightness value of 85.

TABLE 1

| Real-time brightness value of 1st sub-image: 90 | Real-time brightness value of 2nd sub-image: 95 | Real-time brightness value of 3rd sub-image: 85 |
| --- | --- | --- |
| Real-time brightness value of 4th sub-image: 95 | Real-time brightness value of 5th sub-image: 100 | Real-time brightness value of 6th sub-image: 95 |
| Real-time brightness value of 7th sub-image: 85 | Real-time brightness value of 8th sub-image: 95 | Real-time brightness value of 9th sub-image: 85 |

As shown in Table 1, the fifth sub-image of the 9 sub-images has the largest real-time brightness value among the 9 sub-images in the current to-be-displayed image. Thus, the real-time brightness value of the fifth sub-image in the current to-be-displayed image, i.e. 100, is selected to be the brightness correcting value.

The obtaining a brightness adjusting value of the j-th sub-image in the current to-be-displayed image according to the brightness correcting value include: determining the brightness adjusting value of the j-th sub-image in the current to-be-displayed image according to a ratio of the brightness correcting value to the real-time brightness value of the j-th sub-image in the current to-be-displayed image.

Continuing the above example, according to the brightness correcting value and the ratio of the brightness correcting value to each of the 9 real time brightness values of the current to-be-displayed image as shown in Table 1, the brightness adjusting values of the 9 sub-images in the current to-be-displayed image are obtained respectively, as shown in Table 2.

TABLE 2

| For the 1st sub-image, brightness adjusting value: 10/9 | For the 2nd sub-image brightness adjusting value: 100/95 | For the 3rd sub-image brightness adjusting value: 100/85 |
| --- | --- | --- |
| For the 4th sub-image brightness adjusting value: 100/95 | For the 5th sub-image brightness adjusting value: 100/100 | For the 6th sub-image brightness adjusting value: 100/95 |
| For the 7th sub-image brightness adjusting value: 100/85 | For the 8th sub-image brightness adjusting value: 100/95 | For the 9th sub-image brightness adjusting value: 100/85 |

For example, as shown in Tables 1 and 2, the first sub-image, i.e. the one at the upper left corner, in the current to-be-displayed image has a real-time brightness value of 90, while the brightness adjusting value of this first sub-image is 10/9. Hence, an inverse increase in value is needed.

Optionally, if the current to-be-displayed image is a non-pure color image, the average brightness value of each of the sub-images will be taken as the real-time brightness value of this sub-image.

The maximum value among the real-time brightness values of the M sub-images are taken as the brightness correcting value.

Since a non-pure color image has nonuniform brightness, the average brightness value of each of the sub-images may be taken as the real-time brightness value of this sub-image.

Step 103: a brightness value of a j-th sub-image in an f-th to-be-displayed image among N images to be displayed following the current to-be-displayed image is adjusted according to the brightness adjusting value of the j-th sub-image in the current to-be-displayed image, where the j-th sub-image in the current to-be-displayed image has the same displaying region on the screen as the j-th sub-image in the f-th to-be-displayed image, where N is a positive integer greater than or equal to 1, and f is a positive integer taken in sequence from [1, . . . , N].

When an image is projected, light beams typically have different transmission characteristics. Hence, a pure color image is needed to test whether brightness of respective projection regions is uniform, so as to determine brightness unevenness caused by factors innate to the projection system. Meanwhile, a brightness adjusting value may also be determined, which may be utilized to adjust real time brightness values of other images, thereby overcoming the problem of nonuniform brightness due to innate defects in the projection system. That is, the brightness adjusting value acquired previously in a moment for the j-th sub-image in the current to-be-displayed image may be applied to adjust the brightness value of the j-th sub-image in the image to be displayed in the next moment.

Optionally, the pure color image in the embodiment may be a graphic card in white or other pure colors, such as primary colors RGB (red, green, blue) or CMY (cyan, magenta and yellow). The particular way of adjustment may also vary under graphic cards of different colors. A signal format of an input image typically includes brightness of each of the RGB primary colors. When a white graphic card is employed, the real time brightness values thus acquired are used to correct the brightness values of each of the RGB primary colors. When primary color graphic cards are employed, real time brightness values are acquired under respective primary colors, respectively, which are subsequently used to determine brightness correcting values of the respective primary colors. Then, brightness adjusting values of each sub-image in the current to-be-displayed image are acquired, followed by adjusting the brightness values of the respective primary colors of the input image according to their brightness adjusting values.

The above step 103 may be implemented in the following manner. The brightness value of the light source light beams from the DMD, which corresponds to the j-th sub-image in the f-th to-be-displayed image, is adjusted according to the brightness adjusting value of the j-th sub-image in the current to-be-displayed image, so that the brightness value of the j-th sub-image in the f-th to-be-displayed image is presented on the screen with the same brightness value as sub-images other than the j-th sub-image in the f-th to-be-displayed image.

The aforementioned adjusting the brightness value of the light source light beams from the DMD, which corresponds to the j-th sub-image in the f-th to-be-displayed image, according to the brightness adjusting value of the j-th sub-image in the current to-be-displayed image, includes:

adjusting an image signal of an original image corresponding to the j-th sub-image in the f-th to-be-displayed image according to the brightness adjusting value of the j-th sub-image in the current to-be-displayed image; and adjusting the brightness value of the light source light beams from the DMD, which corresponds to the original image corresponding to the j-th sub-image in the f-th to-be-displayed image, according to the adjusted image signal of the original image corresponding to the j-th sub-image in the f-th to-be-displayed image.

Optionally, the above step 103 may be implemented in the following manner: adjusting an image signal of an original image corresponding to the j-th sub-image in the f-th to-be-displayed image, according to the brightness adjusting value of the j-th sub-image in the current to-be-displayed image; and obtaining a digital micro mirror device (DMD) driving signal according to the adjusted image signal of the original image corresponding to the j-th sub-image in the f-th to-be-displayed image, the DMD driving signal is for controlling a switching period of the DMD, so as to adjust the brightness value of the j-th sub-image in the f-th to-be-displayed image.

Particularly, in combination with FIG. 3, after the brightness adjusting value of the j-th sub-image in the current to-be-displayed image is acquired, the brightness adjusting value is utilized to adjust the original image signal corresponding to the j-th sub-image in the f-th to-be-displayed image. Then, the adjusted original image signal corresponding to the j-th sub-image in the f-th to-be-displayed image is converted into a DMD driving signal. The DMD controls each DMD mini reflector contained therein according to the driving signal, causing the respective DMD mini reflectors to be rotated to different angles, achieving the purpose of adjusting the brightness value of the light source light beams. The rotated DMD mini reflectors reflect the light source light beams to the optic set, so as to form an image through the optic set. The light beams after the image formation are shot towards the reflector and reflected to the screen via the reflector. At this moment, since the brightness value of the j-th sub-image in the f-th to-be-displayed image has been adjusted according to the brightness adjusting value of the j-th sub-image in the current to-be-displayed image, the brightness value of each of the sub-images in the f-th to-be-displayed image is adjusted, thus the brightness values of the M sub-images in the f-th to-be-displayed image become uniform.

Continuing the above example, taking the first sub-image in the current to-be-displayed image as an example, the brightness adjusting value of the first sub-image in the current to-be-displayed image is 10/9, and the brightness value of the original image signal corresponding to the j-th sub-image in the f-th to-be-displayed image is 180. According to the brightness adjusting value of 10/9, the brightness value of the original image signal corresponding to the j-th sub-image in the f-th to-be-displayed image is adjusted to $$180 \times \frac{10}{9} = 200.$$

Following the adjustment, the adjusted original image signal corresponding to the j-th sub-image in the f-th to-be-displayed image with the value 200 is converted into a DMD driving signal. The above process continues, causing the brightness value of the j-th sub-image in the f-th to-be-displayed image, which is ultimately projected onto the screen via the reflector, to be 200.

In a possible implementation, the brightness adjusting value of the j-th sub-image in the current to-be-displayed image may be used to adjust in sequence the brightness value of the next image to be displayed, or to adjust the brightness values of the next N images to be displayed.

In another possible implementation, the disclosed solution may be executed separately during predetermined periods. That is, the brightness adjusting value is determined once for the duration of each period, during which the brightness value adjusting method according to the present disclosure is applied to all subsequent images to be displayed following the current to-be-displayed image.

For example, during a first predetermined period, the current to-be-displayed image is the first image to be displayed during this period. A brightness value is acquired for each sub-image in this first image, and a brightness adjusting value is determined for the each sub-image in this first image according to a brightness correcting value. Then, brightness adjusting steps in the present disclosure are performed for all images to be displayed following the first image during the first predetermined period, according to the obtained brightness adjusting value. Then, during the next predetermined period, the current to-be-displayed image is the first image to be displayed during this period. A brightness value is acquired for each sub-image in this first image, and a brightness adjusting value is determined for the each sub-image in this first image according to a brightness correcting value. Then, brightness adjusting steps in the present disclosure are performed for all images to be displayed following the first image during this next predetermined period, according to the obtained brightness adjusting value. The subsequent periods can be done in the same manner. That is, the brightness adjusting value is determined only once for each period.

Step 104: the f-th to-be-displayed image is displayed according to adjusted brightness values of all sub-images in the f-th to-be-displayed image.

By introducing the aforementioned adjusting process, it is possible to adjust the brightness values of the f-th to-be-displayed image in combination with the brightness values of the current to-be-displayed image without changing the light source (e.g. selecting a light source with uniform luminous exitance) and the optical path (e.g. adding a plurality of light uniformizing elements), thereby adjusting the brightness and color for the f-th to-be-displayed image, so as to achieve consistency and uniformity in brightness and color of the f-th to-be-displayed image which is displayed on the screen.

In actual applications, the aforementioned current to-be-displayed image may be a whitefield image. Since data acquired using a whitefield image may represent the brightness uniformity of a projector, steps of the present disclosure are performed for the whitefield image. Then for duration of a period, image processing is carried out for images to be displayed subsequently by using the brightness adjusting value obtained from the whitefield image.

Meanwhile, the method in the present disclosure may also be repeated after a certain period, e.g. 100 hours. Optionally, a counter may be provided in the projection apparatus for recording the operating hours of the same, so that the next brightness adjustment may be automatically triggered and performed after a predefined period expires, or after a user instruction is received.

The embodiment provides a projection image correcting method that includes: receiving real-time brightness values of M sub-images in a current to-be-displayed image, which are acquired by a plurality of sensors arranged on a reflector which is located opposite to a projection lens, where the current to-be-displayed image is a pure color image; obtaining a brightness adjusting value of the j-th sub-image in the current to-be-displayed image according to a brightness correcting value; adjusting, according to the brightness adjusting value of the j-th sub-image in the current to-be-displayed image, a brightness value of a j-th sub-image in an f-th to-be-displayed image; and displaying the f-th to-be-displayed image according to adjusted brightness values of all sub-images in the f-th to-be-displayed image. Since light beams typically have different transmission characteristics when an image is projected, a pure color image is employed in the present disclosure for testing whether brightness of respective projection regions is uniform, so as to determine brightness unevenness caused by factors intrinsic to the projection system. Meanwhile, a brightness adjusting value may also be determined, which may be utilized to adjust real time brightness values of other images, thereby overcoming the problem of nonuniform brightness due to innate defects in the projection system. That is, adjustment is made, in combination with brightness adjusting values obtained from the current image to be displayed, to a brightness value of each sub-image in an f-th to-be-displayed image before the f-th image is displayed on a screen, thereby achieving uniform and even brightness and color among all sub-images in the f-th image ultimately displayed on the screen, and improving image projection quality.

Figure 9:
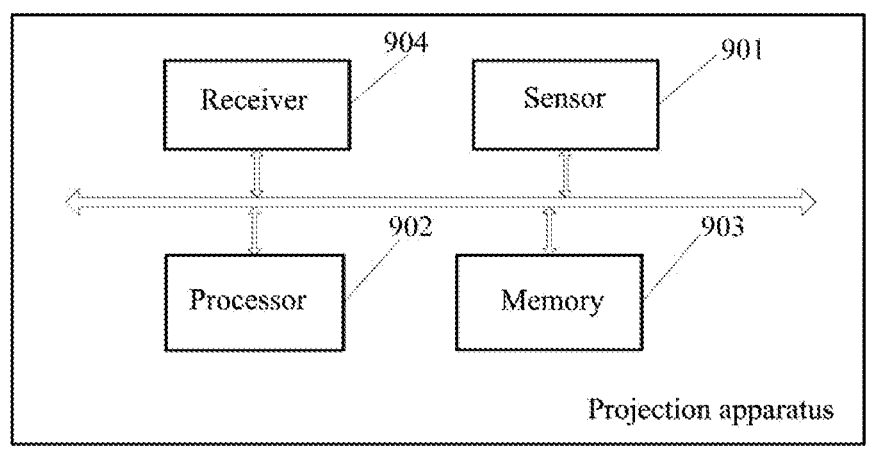
FIG. 9 is a schematic structural diagram of a projection apparatus provided in an embodiment of the present disclosure.

FIG. 9 is a schematic structural diagram of a projection apparatus provided in an embodiment of the present disclosure. As depicted in FIG. 9, the projection apparatus in an embodiment includes:

a brightness sensor 901; a processor 902; a memory 903; and a receiver 904, where the memory 903 is configured to store operating instructions, the brightness sensor 901 is configured to acquire real-time brightness values of M sub-images in a current to-be-displayed image, and the receiver 904 is configured to receive the real-time brightness values of M sub-images in the current to-be-displayed image which are acquired by a plurality of the brightness sensors arranged on a reflector of the projection apparatus, the M being a positive integer greater than or equal to 1; and the processor 902 is configured to call the operating instructions stored in the memory 903 to perform the following operations:

obtaining a brightness adjusting value of a j-th sub-image in the current to-be-displayed image according to the real-time brightness values of the M sub-images, where j is a positive integer taken in sequence from [1, 2, ..., M].

Optionally, the processor 902 is particularly configured to:

determine a brightness correcting value according to the real-time brightness values of the M sub-images; and obtain a brightness adjusting value of the j-th sub-image in the current to-be-displayed image according to the real-time brightness values and the brightness correcting value.

Optionally, the processor 902 is particularly configured to:

take the maximum value among the real-time brightness values of the M sub-images as the brightness correcting value when the current to-be-displayed image is a pure color image.

Optionally, the processor 902 is also particularly configured to:

take an average brightness value of each of the sub-images as the real-time brightness value of the corresponding sub-image when the current to-be-displayed image is a non-pure color image; and take the maximum value among the real-time brightness values of the M sub-images as the brightness correcting value.

Optionally, the processor 902 is particularly configured to:

determine the brightness adjusting value of the j-th sub-image in the current to-be-displayed image according to a ratio of the brightness correcting value to the real-time brightness value of the j-th sub-image in the current to-be-displayed image.

The current to-be-displayed image is the display image corresponding to the real-time brightness values acquired by the brightness sensors.

In particular, the process may begin by acquiring the real-time brightness values of the M sub-images in the current to-be-displayed image using the brightness sensors, then proceed to obtaining a brightness adjusting value of each sub-image in the current to-be-displayed image according to the real-time brightness values.

The brightness correcting value may be set in real time according to actual needs, or be predetermined. Neither the particular value nor the particular means by which that value is acquired is limited in the present disclosure.

The brightness adjusting value is used to compensate the brightness for sub-images of images to be displayed later, that is, to adjust the brightness values of sub-images of images to be displayed following the current to-be-displayed image.

In actual applications, if the current to-be-displayed image is a pure color image, the maximum value among real-time brightness values of M sub-images in the current to-be-displayed image may be selected to be the brightness correcting value.

The pure color image is uniform in terms of brightness, i.e. the real-time brightness value of a sub-image may represent the brightness of the sub-image.

For example, when a pure color image is employed, 9 brightness sensors in FIG. 4 acquire the real-time brightness values of the 9 sub-images in the current to-be-displayed image, respectively, where the first sub-image has a real-time brightness value of 90, the second sub-image has a real-time brightness value of 95, the third sub-image has a real-time brightness value of 85, the fourth sub-image has a real-time brightness value of 95, the fifth sub-image has a real-time brightness value of 100, the sixth sub-image has a real-time brightness value of 95, the seventh sub-image has a real-time brightness value of 85, the eighth sub-image has a real-time brightness value of 95, and the ninth sub-image has a real-time brightness value of 85.

The fifth sub-image of the nine sub-images has the largest real-time brightness value among the 9 sub-images in the current to-be-displayed image. Thus, the real-time brightness value of the fifth sub-image in the current to-be-displayed image, i.e. 100, is selected to be the brightness correcting value.

Continuing the above example, according to the brightness correcting value and the ratio of the brightness correcting value to each of the 9 real time brightness values of the current to-be-displayed image as shown in Table 1, the brightness adjusting values of the 9 sub-images in the current to-be-displayed image are obtained respectively, as shown in Table 2.

For example, as shown in Tables 1 and 2, the first sub-image, i.e. the one at the upper left corner, in the current to-be-displayed image has a real-time brightness value of 90, while the brightness adjusting value of this first sub-image is 10/9. Hence, an inverse increase in value is needed.

Optionally, if the current to-be-displayed image is a non-pure color image, the average brightness value of each of the sub-images will be taken as the real-time brightness value of this sub-image.

Since a non-pure color image has nonuniform brightness, the average brightness value of each of the sub-images may be taken as the real-time brightness value of this sub-image.

Optionally, the processor 902 is also configured to:

adjust a brightness value of a j-th sub-image in an f-th to-be-displayed image among N images to be displayed following the current to-be-displayed image according to the brightness adjusting value of the j-th sub-image in the current to-be-displayed image, where the j-th sub-image in the current to-be-displayed image has the same displaying region on the screen of the projection apparatus as the j-th sub-image in the f-th to-be-displayed image, the N being a positive integer greater than or equal to 1, and the f is a positive integer taken in sequence from [1, . . . , N]; and display the f-th to-be-displayed image according to adjusted brightness values of all sub-images in the f-th to-be-displayed image.

In particular, when an image is projected, light beams typically have different transmission characteristics. Hence, a pure color image may be employed to test whether brightness of respective projection regions is uniform, so as to determine brightness unevenness caused by factors intrinsic to the projection system. Meanwhile, a brightness adjusting value may also be determined, which may be utilized to adjust real time brightness values of other images, thereby overcoming the problem of nonuniform brightness due to innate defects in the projection system. That is, the brightness adjusting value acquired previously in a moment for the j-th sub-image in the current to-be-displayed image may be applied to adjust the brightness value of the j-th sub-image in the image to be displayed in the next moment.

Optionally, the pure color image includes a red image, a green image and a blue image; the real-time brightness values of the M sub-images in the current to-be-displayed image include a real-time brightness value corresponding to red in a sub-image, a real-time brightness value corresponding to green in the sub-image, and a real-time brightness value corresponding to blue in the sub-image.

The processor 902 is particularly configured to:

determine a brightness correcting value according to the real-time brightness values of the M sub-images, the brightness correcting value including: a brightness correcting value corresponding to red, a brightness correcting value corresponding to green, and a brightness correcting value corresponding to blue; and obtain a brightness adjusting value of the j-th sub-image in the current to-be-displayed image according to the brightness correcting value, the brightness adjusting value including: a brightness adjusting value corresponding to red, a brightness adjusting value corresponding to green, and a brightness adjusting value corresponding to blue.

In particular, the pure color image in the embodiment may be a graphic card in white or other pure colors, such as primary colors RGB (red, green, blue) or CMY (cyan, magenta and yellow). The particular way of adjustment may also vary under graphic cards of different colors. A signal format of an input image typically includes brightness of each of the RGB primary colors. When a white graphic card is employed, the real time brightness values thus acquired are used to correct the brightness values of each of the RGB primary colors. When primary color graphic cards are employed, real time brightness values are acquired under respective primary colors, respectively, which are subsequently used to determine brightness correcting values of the respective primary colors. Then, brightness adjusting values of each sub-image in the current to-be-displayed image are acquired, followed by adjusting the brightness values of the respective primary colors of the input image according to their brightness adjusting values.

In particular, an implementation for the processor 902 to adjust a brightness value of a j-th sub-image in an f-th to-be-displayed image among N images to be displayed following the current to-be-displayed image may be in the following manner. That is, the processor is also configured to: adjust the brightness value of the light source light beams emitted from the DMD, which corresponds to the j-th sub-image in the f-th to-be-displayed image, according to the brightness adjusting value of the j-th sub-image in the current to-be-displayed image, so that the brightness value of the j-th sub-image in the f-th to-be-displayed image is presented on the screen with the same brightness value as sub-images other than the j-th sub-image in the f-th to-be-displayed image.

The aforementioned adjusting the brightness value of the light source light beams from the DMD, which corresponds to the j-th sub-image in the f-th to-be-displayed image, according to the brightness adjusting value of the j-th sub-image in the current to-be-displayed image may be realized in the following manner. That is, the processor is particularly configured to:

adjust an image signal of an original image corresponding to the j-th sub-image in the f-th to-be-displayed image according to the brightness adjusting value of the j-th sub-image in the current to-be-displayed image; and adjust the brightness value of the light source light beams from the DMD, which corresponds to the original image corresponding to the j-th sub-image in the f-th to-be-displayed image, according to the adjusted image signal of the original image corresponding to the j-th sub-image in the f-th to-be-displayed image.

Particularly, in combination with FIG. 3, after the brightness adjusting value of the j-th sub-image in the current to-be-displayed image is acquired, the brightness adjusting value is utilized to adjust the original image signal corresponding to the j-th sub-image in the f-th to-be-displayed image. Then, the adjusted original image signal corresponding to the j-th sub-image in the f-th to-be-displayed image is converted into a DMD driving signal. The DMD controls each DMD mini reflector contained therein according to the driving signal, causing the respective DMD mini reflectors to be rotated to different angles, achieving the purpose of adjusting the brightness value of the light source light beams. The rotated DMD mini reflectors reflect the light source light beams to the optic set, so as to form an image through the optic set. The light beams after the image formation are shot towards the reflector, and reflected to the screen via the reflector. At this moment, since the brightness value of the j-th sub-image in the f-th to-be-displayed image has been adjusted according to the brightness adjusting value of the j-th sub-image in the current to-be-displayed image, the brightness value of each of the sub-images in the f-th to-be-displayed image is adjusted, thus the brightness values of the M sub-images in the f-th to-be-displayed image become uniform.

Continuing the above example, taking the first sub-image in the current to-be-displayed image as an example, the brightness adjusting value of the first sub-image in the current to-be-displayed image is 10/9, and the brightness value of the original image signal corresponding to the j-th sub-image in the f-th to-be-displayed image is 180. According to the brightness adjusting value of 10/9, the brightness value of the original image signal corresponding to the j-th sub-image in the f-th to-be-displayed image is adjusted to $$180 \times \frac{10}{9} = 200.$$

Following the adjustment, the adjusted original image signal corresponding to the j-th sub-image in the f-th to-be-displayed image with the value 200 is converted into a DMD driving signal. The above process continues, causing the brightness value of the j-th sub-image in the f-th to-be-displayed image, which is ultimately projected onto the screen via the reflector, to be 200.

In a possible implementation, the brightness adjusting value of the j-th sub-image in the current to-be-displayed image may be used to adjust in sequence the brightness value of the next image to be displayed, or to adjust the brightness values of the next N images to be displayed.

In another possible implementation, the disclosed solution may be executed separately during predetermined periods. That is, the brightness adjusting value is determined once for the duration of each period, during which the brightness value adjusting method according to the present disclosure is applied to all subsequent images to be displayed following the current to-be-displayed image.

For example, during a first predetermined period, the current to-be-displayed image is the first image to be displayed during this period. A brightness value is acquired for each sub-image in this first image, and a brightness adjusting value is determined for the each sub-image in this first image according to a brightness correcting value. Then, brightness adjusting steps in the present disclosure are performed for all images to be displayed following the first image during the first predetermined period, according to the obtained brightness adjusting value. Then, during the next predetermined period, the current to-be-displayed image is the first image to be displayed during this period. A brightness value is acquired for each sub-image in this first image, and a brightness adjusting value is determined for the each sub-image in this first image according to a brightness correcting value. Then, brightness adjusting steps in the present disclosure are performed for all images to be displayed following the first image during this next predetermined period, according to the obtained brightness adjusting value. The subsequent periods can be done in the same manner. That is, the brightness adjusting value is determined only once for each period.

By introducing the aforementioned adjusting process, it is possible to adjust the brightness values of the f-th to-be-displayed image in combination with the brightness values of the current to-be-displayed image without changing the light source (e.g. selecting a light source with uniform luminous exitance) and the optical path (e.g. adding a plurality of light uniformizing elements), thereby adjusting the brightness and color for the f-th to-be-displayed image, so as to achieve consistency and uniformity in brightness and color of the f-th to-be-displayed image which is displayed on the screen.

Optionally, a counter may be additionally provided in the projection apparatus for recording the operating hours of the same, so that the next brightness adjustment may be automatically triggered and performed after a predefined period expires, or after a user instruction is received.

Optionally, the processor 902 is also configured to:
predetermine a weight coefficient corresponding to each of the sub-regions according to a light transmittance of the sub-region on the reflector of the projection apparatus; and
correspondingly, the real-time brightness values of the M sub-images in the current to-be-displayed image are real-time brightness values determined according to the weight coefficients and real-time brightness values acquired by the brightness sensors.

For example, as depicted in FIG. 4, among 9 sub-regions, those at the edge position have the same light transmittance, while the one at the center has a different transmittance. Since this sub-region at the center has a higher transmittance than the others, it may be set with a weight coefficient different from, e.g. smaller than, the other sub-regions.

The real-time brightness value acquired by the brightness sensor is multiplied by the weight coefficient to generate the final real-time brightness value of the sub-region.

The aforementioned components communicate via one or more buses. Those of ordinary skill in the art will appreciate that the particular structure of the apparatus depicted in FIG. 9 is not to limit the present disclosure. Rather, the structure may be in bus or star connection, and may include more components or less components than the number depicted in the figure. Some components may be recombined, or rearranged in alternative ways.

An apparatus of the embodiment can perform the technical solution of any of the above described method embodiments with similar principals and technical effects, which may be referred to in any of the above method embodiments, and will not be repeated herein.

Figure 6:
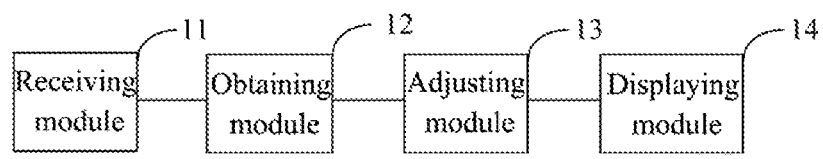
FIG. 6 is a schematic structural diagram of a projection image correcting device provided in an embodiment of the present disclosure.

FIG. 6 is a schematic structural diagram of a projection image correcting device provided in an embodiment of the present disclosure. As depicted in FIG. 6, the device according to an embodiment includes a receiving module, an obtaining module, an adjusting module, and a displaying module.

The receiving module is configured to receive real-time brightness values of M sub-images in a current to-be-displayed image, the real-time brightness values being acquired by a plurality of sensors arranged on a reflector which is located opposite to a projection lens, where the current to-be-displayed image is a pure color image consisting of the M sub-images, M being a positive integer greater than or equal to 1.

The obtaining module is configured to obtain a brightness adjusting value of a j-th sub-image in the current to-bedisplayed image according to a brightness correcting value, where j is a positive integer taken in sequence from [1, 2, . . . , M].

The adjusting module is configured to adjust a brightness value of a j-th sub-image in an f-th to-be-displayed image among N images to be displayed following the current to-be-displayed image, according to the brightness adjusting value of the j-th sub-image in the current to-be-displayed image, where the j-th sub-image in the current to-be-displayed image has the same displaying region on the screen as the j-th sub-image in the f-th to-be-displayed image, where N is a positive integer greater than or equal to 1, and the f is a positive integer taken in sequence from [1, . . . , N].

The displaying module is configured to display the f-th to-be-displayed image according to adjusted brightness values of all sub-images in the f-th to-be-displayed image.

Optionally, the brightness correcting value is the maximum value among real-time brightness values of the M sub-images in the current to-be-displayed image.

Optionally, on the aspect of obtaining a brightness adjusting value of a j-th sub-image in the current to-be-displayed image according to a brightness correcting value, the obtaining module is configured to:

determine the brightness adjusting value of the j-th sub-image in the current to-be-displayed image according to a ratio of the brightness correcting value to the real-time brightness value of the j-th sub-image in the current to-be-displayed image.

Optionally, on the aspect of adjusting a brightness value of a j-th sub-image in an f-th to-be-displayed image according to the brightness adjusting value of the j-th sub-image in the current to-be-displayed image, the adjusting module is configured to:

adjust the brightness value of the light source light beam, which corresponds to the j-th sub-image in the f-th to-be-displayed image, according to the brightness adjusting value of the j-th sub-image in the current to-be-displayed image, so that the brightness value of the j-th sub-image in the f-th to-be-displayed image is presented on the screen with the same brightness value as sub-images other than the j-th sub-image in the f-th to-be-displayed image.

Optionally, on the aspect of adjusting the brightness value of the light source light beam, which corresponds to the j-th sub-image in the f-th to-be-displayed image, according to the brightness adjusting value of the j-th sub-image in the current to-be-displayed image, the adjusting module is configured to:

adjust an image signal of an original image corresponding to the j-th sub-image in the f-th to-be-displayed image according to the brightness adjusting value of the j-th sub-image in the current to-be-displayed image; and adjust the brightness value of the light source light beams which corresponds to the original image corresponding to the j-th sub-image in the f-th to-be-displayed image according to the adjusted image signal of the original image corresponding to the j-th sub-image in the f-th to-be-displayed image.

Optionally, the current to-be-displayed image is a white-field image.

The device of the embodiment may be configured to perform the technical solution of the method embodiments shown in FIGS. 2-5 with similar principals and technical effects, which will not be repeated herein.

An embodiment of the present disclosure also provides a projector, which includes the projection image correcting device described in an embodiment corresponding to FIG. 6.

The device of the embodiment may be configured to perform the technical solution of the method embodiments shown in FIGS. 2-5 with similar principals and technical effects, which will not be repeated herein.

Persons of ordinary skill in the art may understand that, all or a part of steps of the foregoing method embodiments may be implemented by a program instructing relevant hardware. The foregoing program may be stored in a computer readable storage medium. When the program runs, the steps of the foregoing embodiment methods are performed. The foregoing storage medium includes various mediums capable of storing program codes, such as a ROM, a RAM, a magnetic disk, or an optical disc.

Finally, it should be noted that the foregoing embodiments are merely intended for describing, rather than limiting, the technical solutions of the present disclosure. Although the present disclosure is described in detail with reference to the foregoing embodiments, persons of ordinary skill in the art should understand that they may still make modifications to the technical solutions described in the foregoing embodiments, or make equivalent replacements to some or all technical features therein; however, these modifications or replacements do not make the essence of corresponding technical solutions depart from the scope of the technical solutions in the embodiments of the present disclosure.

What is claimed is:

1. A projection apparatus, comprising: a projection light source assembly, a digital micro mirror device (DMD) assembly and a screen, wherein the apparatus further comprises:

an ultra short-focus lens, wherein the ultra short-focus lens comprises an optic set and a reflector; the optic set is configured to receive a light beam emitted from the DMD assembly, and transmit the light beam onto the reflector; the reflector is configured to reflect the light beam transmitted from the optic set onto the screen;

wherein the reflector is provided with a plurality of brightness sensors on a side away from the screen, the brightness sensors are configured to acquire a real-time brightness value of at least one sub-image in a current to-be-displayed image;

wherein the projection apparatus is configured to adjust image brightness, and a brightness adjusting value corresponding to each sub-image in the current to-be-displayed image is determined according to the real-time brightness value.

2. The apparatus according to claim 1, wherein the reflector comprises, on the side away from the screen, two or more sub-regions, each of the two or more sub-regions having one to one correspondence to each sub-image in the current to-be-displayed image, at least two of the two or more sub-regions having different areas.

3. The apparatus according to claim 2, wherein a sub-region located at an edge of the reflector is smaller in area than a sub-region located near a center of the reflector.

4. The apparatus according to claim 1, wherein the reflector comprises, on the side away from the screen, two or more sub-regions, each of the two or more sub-regions having one to one correspondence to each sub-image in the current to-be-displayed image, each of the sub-regions having same area.

5. The apparatus according to claim 2, wherein each of the brightness sensors is located at a central position of the sub-region.

6. The apparatus according to claim 2, wherein,
the brightness sensors are arranged on a structural member correspondingly according to a position of the sub-region, the structural member being fixedly arranged on the side of the reflector away from the screen.

7. The apparatus according to claim 2, wherein different sub-regions on the reflector have different light transmittance.

8. The apparatus according to claim 1, further comprising:
a counter, configured to record operating hours of the projection apparatus, so that a next adjustment is automatically triggered and performed after a predefined duration following the completion of an image brightness adjustment.

9. A projection image correcting method, applied to the projection apparatus according to claim 1, wherein the method comprises:
receiving real-time brightness values of M sub-images in a current to-be-displayed image, the real-time brightness values being acquired by the plurality of brightness sensors arranged on the reflector of the projection apparatus, wherein M is a positive integer greater than or equal to 1; and
obtaining a brightness adjusting value of a j-th sub-image in the current to-be-displayed image according to the real-time brightness values of the M sub-images, wherein j is a positive integer taken in sequence from [1, 2, . . . , M].

10. The method according to claim 9, wherein the obtaining a brightness adjusting value of a j-th sub-image in the current to-be-displayed image according to the real-time brightness values of the M sub-images comprises:
determining a brightness correcting value according to the real-time brightness values of the M sub-images; and
obtaining the brightness adjusting value of the j-th sub-image in the current to-be-displayed image according to the real-time brightness values and the brightness correcting value.

11. The method according to claim 10, wherein the determining a brightness correcting value according to the real-time brightness values of the M sub-images comprises:
taking a maximum value among the real-time brightness values of the M sub-images as the brightness correcting value when the current to-be-displayed image is a pure color image.

12. The method according to claim 10, wherein the determining a brightness correcting value according to the real-time brightness values of the M sub-images comprises:
taking an average brightness value of each of the sub-images as the real-time brightness value corresponding to the each of the sub-images when the current to-be-displayed image is a non-pure color image; and
taking a maximum value among the real-time brightness values of the M sub-images as the brightness correcting value.

13. The method according to claim 11, wherein the obtaining a brightness adjusting value of the j-th sub-image in the current to-be-displayed image according to the real-time brightness values and the brightness correcting value comprises:
determining the brightness adjusting value of the j-th sub-image in the current to-be-displayed image according to a ratio of the brightness correcting value to the real-time brightness value of the j-th sub-image in the current to-be-displayed image.

14. The method according to claim 9, further comprising:
adjusting, according to the brightness adjusting value of the j-th sub-image in the current to-be-displayed image, a brightness value of a j-th sub-image in an f-th to-be-displayed image among N images to be displayed following the current to-be-displayed image, wherein the j-th sub-image in the current to-be-displayed image has the same displaying region on the screen of the projection apparatus as the j-th sub-image in the f-th to-be-displayed image, the N being a positive integer greater than or equal to 1, and the f being a positive integer taken in sequence from [1, . . . , N]; and
displaying the f-th to-be-displayed image according to adjusted brightness values of all sub-images in the f-th to-be-displayed image.

15. The method according to claim 14, wherein the adjusting, according to the brightness adjusting value of the j-th sub-image in the current to-be-displayed image, a brightness value of a j-th sub-image in an f-th to-be-displayed image comprises:
adjusting an image signal of an original image corresponding to the j-th sub-image in the f-th to-be-displayed image according to the brightness adjusting value of the j-th sub-image in the current to-be-displayed image; and
obtaining a digital micro mirror device (DMD) driving signal according to the adjusted image signal of the original image corresponding to the j-th sub-image in the f-th to-be-displayed image, the DMD driving signal is for controlling a switching period of a DMD, to adjust the brightness value of the j-th sub-image in the f-th to-be-displayed image.

16. The method according to claim 9, further comprising:
predetermining a weight coefficient corresponding to each of the sub-regions according to a transmittance of the each of the sub-regions of the reflector of the projection apparatus; and
correspondingly, the real-time brightness values of the M sub-images in the current to-be-displayed image are real-time brightness values which are determined according to the weight coefficients and real-time brightness values acquired by the brightness sensors.

17. The method according to claim 11, wherein the pure color image comprises a red image, a green image and a blue image; the real-time brightness values of the M sub-images in the current to-be-displayed image comprise a real-time brightness value corresponding to red in each of the sub-images, a real-time brightness value corresponding to green in each of the sub-images, and a real-time brightness value corresponding to blue in each of the sub-images;
the obtaining a brightness adjusting value of a j-th sub-image in the current to-be-displayed image according to the real-time brightness values of the M sub-images comprises:
determining a brightness correcting value according to the real-time brightness values of the M sub-images; the brightness correcting value comprises: a brightness correcting value corresponding to red, a brightness correcting value corresponding to green, and a brightness correcting value corresponding to blue; and
obtaining a brightness adjusting value of the j-th sub-image in the current to-be-displayed image according to the brightness correcting value; the brightness adjusting value comprises: a brightness adjusting value corresponding to red, a brightness adjusting value corresponding to green, and a brightness adjusting value corresponding to blue.

18. A projection apparatus, comprising:
a memory and a processor, wherein the memory includes operating instructions executed by the processor to perform operations comprising:
receiving real-time brightness values of M sub-images in a current to-be-displayed image, the real-time brightness values being acquired by the plurality of brightness sensors arranged on the reflector of the projection apparatus, wherein M is a positive integer greater than or equal to 1; and
obtaining a brightness adjusting value of a j-th sub-image in the current to-be-displayed image according to the real-time brightness values of the M sub-images, wherein j is a positive integer taken in sequence from $[1, 2, \ldots, M]$.

19. The apparatus according to claim 18, wherein the operations further comprise:
determining a brightness correcting value according to the real-time brightness values of the M sub-images; and
obtaining the brightness adjusting value of the j-th sub-image in the current to-be-displayed image according to the real-time brightness values and the brightness correcting value.

* * * * *